Patented Apr. 2, 1940

2,196,028

UNITED STATES PATENT OFFICE 2,196,028

AZO DYESTUFFS

Hans Roos, Leverkusen-I. G. Werk, Germany, assignor to General Aniline & Film Corporation, a corporation of Delaware No Drawing. Application January 6, 1938, Serial No. 183,585. In Germany January 14, 1937

4 Claims. (Cl. 260—166)

The present invention relates to new azodyestuffs and to a method of preparing the same; more particularly it relates to substantive azodyestuffs which may be represented by the following formula:

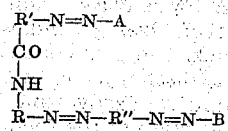

In this formula R and R' stand for radicals of the benzene series, i. e., they stand for benzene nuclei themselves and also for benzene nuclei which are substituted by alkyl, halogen and the like, —R''—N= stands for the radical of an aminonaphthol mono- or disulfonic acid, A stands for the radical of an o-hydroxycarboxylic acid of the benzene series and B for the radical of a coupling component of the benzene series capable of coupling twice, or a monoazo derivative thereof.

My new dyestuffs are obtained by further diazotizing the already known diazodyestuffs—obtained by tetrazotizing monoaminobenzoylated diamines of the benzene series and coupling first with an o-hydroxycarboxylic acid and secondly with an aminonaphthol-mono- or disulfonic acid—and then coupling with a coupling component of the benzene series capable of coupling twice, or a monoazo derivative thereof.

Coupling components of the benzene series which are capable of coupling twice are for instance m-phenylenediamine, m-aminophenol, resorcinol and the substitution products thereof, i. e., both nuclear substitution products and those substituted in the hydroxy or amino group.

The new dyestuffs dye cellulosic fibers in general reddish to deep blackish-brown shades which are distinguished by good neutral and alkaline dischargeability. Compared with the corresponding known dyestuffs of the p-p'-diamino-diphenyl series, my new dyestuffs exhibit an improved neutral and alkaline dischargeability. They can be aftertreated in the usual manner, as for instance, with formaldehyde, in case a final coupling component suitable for this treatment has been used, or with diazotized p-nitraniline, m-nitraniline, nitroanisidine, and similar diazo compounds.

The following examples illustrate the invention without being restricted thereto, the parts being by weight:

Example 1

62.6 parts of the dyestuff, which is obtainable by tetrazotizing in the usual manner p-aminobenzoyl-p-phenylenediamine and coupling first with a mixture consisting of 80% of salicylic acid and 20% of o-cresotinic acid and then with 2.8-aminonaphthol-6-sulfonic acid, are stirred into water and diazotized with 7 parts of sodium nitrite and 30 parts of hydrochloric acid (19.5° Bé.). After about 2 hours diazotization is complete and the diazotization mixture is run into a solution of 11 parts of m-phenylenediamine containing 30 parts of sodium carbonate. The dyestuff precipitates and can be directly pressed. It corresponds in its free state to the following formula:

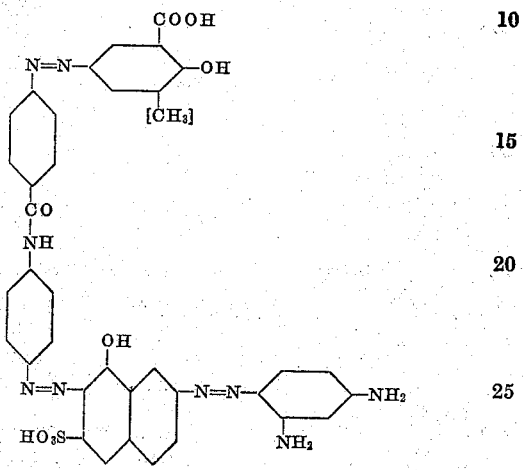

and dyes cotton deep brown shades, which can be aftertreated with formaldehyde. By this treatment the fastness to washing is very much improved, while the excellent neutral and alkaline dischargeability does not suffer.

If in this example instead of m-phenylenediamine as coupling component 32 parts of the sodium salt of the azodyestuff prepared in the usual way from diazotized sulfanilic acid plus m-phenylenediamine are used, a dyestuff is obtained which also dyes cotton deep brown shades and which is discharged well by alkaline and neutral discharging agents.

A somewhat bluish brown-dyeing dyestuff is obtained by using as final coupling component the chrysoidine from 1-aminonaphthalene-4-sulfonic acid and m-phenylenediamine.

If the final coupling is carried out with 1.3-phenylenediamine-4-sulfonic acid, a dyestuff is obtained which dyes cotton similar shades. These dyeings are especially suitable for the aftertreatment with diazotized p-nitraniline, whereby deep yellowish-brown dyeings are obtained, of about the shade of the dyestuff of the example of British patent application No. 8144/1909, first paragraph, which are however distinguished by improved dischargeability and fastness to light.

When using other aminonaphthol sulfonic acids, dyestuffs of similar properties are obtained the shades of which, for instance, when using 2.5-aminonaphthol-7-sulfonic acid, incline to reddish-brown, when employing 2.8-aminonaphthol-3.6-disulfonic acid to blackish-brown.

More reddish shades are obtained by using instead of p-aminobenzoyl-p-phenylenediamine, aminobenzoyl-toluylenediamine as diazotization component. The dyestuffs thus obtained show similar properties.

*Example 2*

62.6 parts of the dyestuff which is obtained by tetrazotizing p-aminobenzoyl-p-phenylenediamine and coupling with salicylic acid and 2.8-aminonaphthol-6-sulfonic acid, are further diazotized as indicated in Example 1. By coupling with 10 parts of resorcinol an azodyestuff which corresponds in its free state to the following formula:

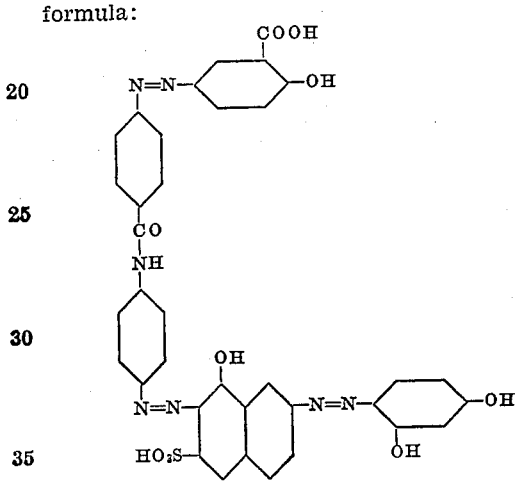

is obtained, which dyes cotton reddish-brown shades. When after-treated with formaldehyde, the dyeing becomes somewhat more reddish and is discharged well by neutral and alkaline discharging agents.

If in this example instead of resorcinol as coupling component 31 parts of the monoazodyestuff obtained in the usual manner from m-sulfanilic acid and resorcinol are used, a dyestuff is obtained, which in contrast to the above dyestuff, which has been coupled with resorcinol only, yields on cotton more bluish-red shades. The dyeing can be aftertreated on the fiber with diazotized p-nitraniline in the usual way, whereby a brown is obtained of good dischargeability.

Similar dyestuffs are obtained by using as coupling component in this example instead of resorcinol m-aminophenol.

I claim:

1. Substantive azodyestuffs of the formula:

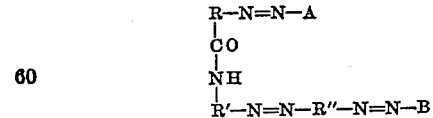

wherein R and R' stand for radicals of the benzene series, —R''—N= for a radical selected from the group consisting of aminonaphthol mono- and disulfonic acids, A stands for an o-hydroxycarboxylic acid of the benzene series and B for the radical of a coupling component selected from the group consisting of m-diamino, m-aminohydroxy, m-dihydroxy compounds of the benzene series and the phenylazo, naphthylazo, sulfophenylazo, sulfonaphthylazo derivatives thereof, dyeing cellulosic fibers reddish to deep blackish-brown shades of good neutral and alkaline dischargeability.

2. Substantive azodyestuffs of the formula:

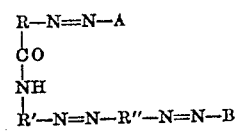

wherein R and R' stand for radicals of the benzene series, the connecting NH.CO-bridge and the —N=N—groups being attached to the p-positions of these radicals, —R''—N= stands for a radical selected from the group consisting of aminonaphthol mono- and disulfonic acids, A stands for an o-hydroxycarboxylic acid of the benzene series and B for the radical of a coupling component selected from the group consisting of m-diamino, m-aminohydroxy, m-dihydroxy compounds of the benzene series and the phenylazo, naphthylazo, sulfophenylazo, sulfonaphthylazo, derivatives thereof, dyeing cellulosic fibers reddish to deep blackish-brown shades of good neutral and alkaline dischargeability.

3. The substantive azodyestuff which corresponds in its free state to the following formula:

dyeing cellulosic fibers deep blackish-brown shades of good neutral and alkaline dischargeability.

4. The substantive azodyestuff which corresponds in its free state to the following formula:

dyeing cellulosic fibers reddish-brown shades of good neutral and alkaline dischargeability.

HANS ROOS.